Patented Sept. 7, 1954

2,688,570

UNITED STATES PATENT OFFICE 2,688,570

WATER-RESISTANT NONFIBROUS REGENERATED CELLULOSE AND PROCESS OF PRODUCING THE SAME

William M. Wooding, Springdale, Conn., assignor to American Cyanamid Company, New York, N. Y., a corporation of Maine No Drawing. Application February 24, 1951, Serial No. 212,701

12 Claims. (Cl. 117—76)

This invention relates to a process for treating non-fibrous cellulosic films in order to improve the bonding of said films to the subsequently-applied top-coat. More specifically, this invention relates to the process of treating non-fibrous regenerated cellulosic films with a thermosetting anionic sulfanilic acid modified aminoplast resin, such as sulfanilic acid melamine-formaldehyde resin or sulfanilic acid urea-formaldehyde resin. Still further, this invention relates to a process of treating non-fibrous regenerated cellulosic films by impregnating said films with the above-mentioned resins in an aqueous dispersion containing a plasticizing agent, removing the film from the bath, drying the film, and thereby curing the affixed resin, and subsequently applying the water-repellent topcoat to the film.

One of the objects of the present invention is to improve the bonding of the water-repellent topcoats to regenerated cellulosic films in order that their application and use commercially can be expanded to fields other than those already tried, and to those applications which, having been tried, have not proven to be successful.

A further object of the present invention is to improve the bonding of the topcoat to the regenerated cellulosic films to such a degree that water immersion for prolonged periods does not materially affect said bonding, nor does it result in the separation of the topcoat from the regenerated cellulosic film base.

A still further object of the present invention is to produce regenerated cellulosic films bonded to a water-repellent topcoat having such a marked degree of water resistance and repellency that even after prolonged immersion in water, the topcoat does not tend to form blisters and other indications of separation from the cellulosic film base.

A still further object of the present invention is to produce regenerated cellulosic films having such marked improvements in water repellency, that they will have a much greater application as wrapping materials, particularly when used for the purpose of packaging moist foods, such as fish, cheese, fresh vegetables, and the like, and frozen foods, such as frozen vegetables, frozen berries, frozen fruits and the like. These and other objects of the present invention will be discussed more fully hereinbelow.

Non-fibrous regenerated cellulosic films have been found utilizable for the packaging of many products which, in the course of storage, shipment and display, must be subjected to moist atmospheric conditions and, as a consequence, the water-repellent topcoats which have been attached to the regenerated cellulosic film bases, tend to slough off, even after brief exposure to moist atmospheric conditions. This factor has limited somewhat the expansion of the use of the regenerated cellulosic films in additional fields, because of this defective characteristic. Considerable work has been done in an endeavor to produce an anchoring agent which will securely bond the water-repellent topcoat to the regenerated cellulosic film bases so that these cellulosic films, when so treated, may be subjected to moist atmospheric conditions and even water immersion for prolonged periods of time, while still remaining intact and continuing to provide the necessary protection which the packaged products require.

In order that the present invention may be completely understood, the following examples are set forth. These examples are set forth solely for the purpose of illustration and should not be interpreted as limitations on the case, except as indicated in the appended claims.

*Example 1*

A strip of wet, swollen, non-fibrous cellulosic film is immersed in a 1% aqueous dispersion of a sulfanilic acid modified urea-formaldehyde anionic resin for a period of about 5–10 minutes. The film is removed from the resin dispersion and is then immersed in a plasticizing bath containing 8% glycerol in aqueous solution. The film is then removed from the plasticizing bath and dried for about 10 minutes at 200° F. on a drying frame. It is desirable to secure the film in order that there be no shrinking during the drying operation. In a continuous film-treating process, the tension on the film, as it passes over the rollers, will be sufficient to keep the film from shrinking. The film is then coated with a water-repellent topcoat and then subjected to a water immersion test for an extended period of time.

This water immersion test is an accelerated test, which is accomplished by subjecting the treated film to immersion in water, the temperature of which is controlled between 180–190° F. The treated film is removed from the water bath at approximately 5 minute intervals and examined for blisters and sloughing. After more than 20 minutes of water immersion, the film was removed and examined and found to indicate no signs of blistering or sloughing of the topcoats from the film base. Similar strips of cellulosic film strips are prepared, except that no resin is used to impregnate the film, but rather the film itself is coated with a water-repellent topcoat and subjected to the same accelerated water immersion test; and it is found that the water-resistant topcoats sloughed off completely in one instance in 1 minute and 15 seconds, and in another instance the topcoat sloughed off completely in one minute.

*Example 2*

A wet strip of swollen, non-fibrous cellulosic film is immersed in a 0.1% aqueous dispersion of a sulfanilic acid modified melamine-formaldehyde anionic resin in a manner set forth in Example 1. After the water-repellent topcoat has been applied, the film is then subjected to the accelerated water immersion test as outlined above and found that the resistance to sloughing extends for approximately 19 and ½ minutes.

Other samples of the regenerated cellulosic film were treated in a similar manner but in which the concentration of the resin in the aqueous dispersion varied between about 0.01–5%. It was found that although fair bonding could be accomplished in the very low concentrations that it was generally desirable to have at least 0.1% of the resin present, and it was further found that when the amounts of resin over and beyond about 3% by weight based on the total weight of the resin aqueous dispersion were used, results were not markedly improved, as an optimum appeared to have been reached.

In the practice of the process of the present invention, it is desirable to introduce the cellulosic films in the aqueous resin dispersion in a wet, swollen condition. Generally, in the manufacture of the finished moisture-resistant films, the steps from the manufacture of the film itself, through the subsequent treatment of the film with the resin dispersion are continuous. In such a process, the film is introduced into the aqueous resin dispersion directly in a wet and swollen condition. On the other hand, if the steps from the production of the film to the treatment of the film are not continuous, it will be necessary to subject the film to immersion in an aqueous bath in order to bring the film into a wet and reswollen state. There are a number of different modifications of the process of treating the films in accordance with the practice of this invention and, for the sake of clarity, a number of these different modifications are enumerated hereinbelow.

One of the preferred embodiments of the instant invention will be to introduce the wet, swollen film into the aqueous resin dispersion, into which a plasticizing agent has been incorporated. The period of time during which the film should be immersed in the aqueous dispersion of the resin is about 2–10 minutes. The film is then removed from the resin plasticizer bath and passed through a drying chamber, which serves not only to remove the moisture from the film but serves further to partially polymerize the resin on and in the film itself. At this point, the topcoat may be applied directly, or the film may be rolled up and stored for subsequent application of the moisture resistant topcoat.

A further modification of the present invention is to introduce the wet, swollen cellulosic film into an aqueous dispersion of the resin, remove the film from the resin bath, introduce the film into a separate plasticizing bath, whereupon it may be removed, dried and coated.

A still further modification of the process itself may be accomplished by introducing the wet, swollen film into an aqueous resin dispersion and, upon removal therefrom, the film may be subjected to a washing step to remove any excess resin which may have become impregnated in the surface of the film. (This step is generally advisable when the concentration of the resin in the aqueous dispersion is high.) The film is then removed from the washing bath and introduced into the plasticizing bath from which it is subsequently removed, dried and coated with the moisture-resistant coating in a manner comparable to that set forth hereinabove.

Still further, the process may be modified by spraying the wet, swollen film with an aqueous dispersion of the resin, partially drying the film, subjecting the film to treatment in a plasticizing bath and, upon removal therefrom, a second and more complete drying step may be accomplished, whereupon the film is then ready for the application of the moisture-resistant topcoat.

There are further modifications of the general process itself which will be obvious to anyone skilled in the art and each of these modifications is intended to be within the scope of the present invention.

The plasticizing, or softening agents, mentioned hereinabove, which are used in the practice of the process of this invention are water soluble organic compounds, such as water soluble polyhydric alcohols, such as ethylene glycol, glycerol, propylene glycol and the like, or the water soluble ureas, such as urea, thiourea, and the like. It is preferred that the plasticizing bath be an aqueous solution of a water-soluble polyhydric alcohol of comparatively low concentration; that is, about 8%. Glycerol is the preferred plasticizing agent, from the standpoint of economy and effectiveness.

In the treatment of the non-fibrous regenerated cellulosic films, the step of immersing the film in the plasticizing bath may be accomplished either before immersion in the aqueous resin dispersion or the plasticizing agent may be incorporated in the aqueous resin dispersion, or the immersion in the plasticizing bath may be accomplished subsequent to the immersion of the film in the aqueous resin dispersion.

The thermosetting anionic resins which are used in the practice of the process of the present invention may be prepared in a number of ways, such as those which are conventional in the art. In order to illustrate some of these concepts, the following examples are set forth, in which all parts are parts by weight. It should be remembered that these examples are set forth for the purpose of illustration only and should not be interpreted as limitations on the case, except as indicated in the appended claims.

*Resin A*

200 parts of urea and 595 parts of a 37% aqueous formaldehyde solution are introduced into a suitable reaction chamber equipped with stirrer, thermometer and reflux condenser. The pH is adjusted to about 9.5 with a sodium hydroxide solution. The solution is then heated to about 70° C. and maintained at about 70–75° C. for 30 minutes. A water solution of the reaction product of sodium hydroxide and anhydrous sulfanilic acid is prepared in which 34 parts of sulfanilic acid are coreacted with 78 parts of a 10% sodium hydroxide solution and dissolved in 86 parts of water. This reaction product solution is introduced into the reaction sphere and the pH adjusted to about 2.5–3.5 with hydrochloric acid or sodium hydroxide, whichever is necessary. The reaction mixture is then refluxed for approximately 1 hour and it will be noted that the pH will increase somewhat during the refluxing period. The pH is then readjusted to about 3.5. The resultant resinous product is cooled to and maintained at about 50–55° C. during which time the viscosity of the syrup will steadily increase. When the desired viscosity has been reached, the reaction may be stopped by adjusting the pH to about 8–8.5 with an alkalizing agent, such as triethanolamine. The reaction product is then cooled to approximate room temperature. The color of the resultant resinous material will be clear with a yellowish tinge, and will have a viscosity on the Gardner-Holdt scale at 25° C., of 160–200 centipoises, and will be miscible with water in all proportions.

*Resin B*

126 parts of melamine and 235 parts of a 37% aqueous formaldehyde solution are introduced into a suitable reaction chamber and the pH is adjusted to about 4 by the addition of a 10% aqueous sodium hydroxide solution. The reaction chamber is equipped as before and the reaction mixture is heated to a temperature of about 80° C. and maintained at about that temperature for approximately one-half hour. A separately-prepared aqueous solution of the sodium salt of sulfanilic acid produced by reacting 39 parts of sulfanilic acid monohydrate with 9.5 parts of sodium hydroxide in 125 parts of water is then introduced into the sphere of reaction and the pH is adjusted, if necessary to about 11 and the reaction mixture is heated to a temperature of about 95–100° C. and maintained at that temperature for about 2 hours and 20 minutes, whereupon the pH will have dropped down to about 9. The viscosity of the 50% solids solution of the resin is about X on the Gardner-Holdt scale at 25° C. The resultant resinous solution was miscible with water in virtually all proportions.

When the sulfanilic acid is incorporated into the sphere of reaction, it can be done in the form of a salt, such as an alkaline salt or an amine salt. The reason for using the salt of the sulfanilic acid is because the acid itself is quite insoluble in water and would not readily react in the aqueous formaldehyde aminoplast solution. The sulfanilic acid, however, does readily dissolve in an alkali solution, especially when forming the sodium salt. It is preferred that the lightest colored sulfanilic acid be used, as the ultimate resin should be one of clear coloration.

In the preparation of the urea-formaldehyde reaction product prior to its modification with the sulfanilic acid, one may use mol ratios of urea to formaldehyde within the range of 1:1.5 up to 1:3, preferably 1:1.8–1:2.5, respectively. In the modification of the urea-formaldehyde resin with the sulfanilic acid, it is preferred that the mol ratio of the urea to the sulfanilic acid be within the range of 1:0.03–1:0.35.

In the preparation of the melamine-formaldehyde resin, it is preferred that the mol ratio of melamine to formaldehyde be within the range of 1:2 up to 1:5, and preferably within the range of 1:2.5–1:3.5, respectively. The ratio of the melamine to the sulfanilic acid should be within the range of 1:0.05–1:0.8 and preferably within the range of 1:0.1–1:0.5, respectively.

The resins which are used in the practice of the process of the present invention should be water soluble or at least water dispersible and further, must be anionic. If too little sulfanilic acid is used to modify either the urea or melamine resins, the resultant modified resin will be water insoluble and, as a consequence, will be undesirable. On the other hand, if too much sulfanilic acid is used in the modification of either the urea or the melamine resins, the water resistance in the modified resins will be too low and, as a consequence, its effectiveness in bonding the water-repellent topcoat to the cellulosic film will be reduced.

After the cellulosic film has been impregnated with the resin dispersion, it is desired to coat the film with the water-repellent topcoat. Amongst those water-repellent topcoats which may be used in the final treatment of the cellulosic films, after they have been subjected to impregnation by the resin dispersion, are those coating compositions containing as the film-containing constituents, compounds such as cellulose nitrate, cellulose acetate, methyl cellulose, deacetylated chitin, rubber, chlorinated rubber, rubber hydrochloride, ethyl cellulose, butyl methacrylate, and moisture-resistant lacquers, waxes, such as montan, beeswax, carnauba, and other conventional film-forming coating materials. Some of these water-repellent coating compound formulations need no additional treatment after application. Some, however, may require a slight heating in order to get the coating to solidify.

I claim:

1. A process for treating non-fibrous regenerated cellulosic films comprising the steps of impregnating said films with an aqueous dispersion of a thermosetting anionic sulfanilic acid modified aminoplast resin, removing the film, incorporating therein a plasticizing agent, drying the film and applying thereto a water-repellent topcoat, wherein the aminoplast resin is selected from the group consisting of melamine-formaldehyde and urea-formaldehyde resins.

2. A process for treating non-firous regenerated cellulosic films comprising the steps of impregnating said films with an aqueous dispersion of a thermosetting anionic sulfanilic acid modified melamine-formaldehyde resin, removing the film, incorporating therein a plasticizing agent, drying the film and applying thereto a water-repellent topcoat.

3. A process for treating non-fibrous regenerated cellulosic film comprising the steps of impregnating said film with an aqueous dispersion of a thermosetting anionic sulfanilic acid modified urea-formaldehyde resin, removing the film, incorporating therein a plasticizing agent, drying the film and applying thereto a water-repellent topcoat.

4. A process for treating non-fibrous regenerated cellulosic film comprising the steps of impregnating said film with an aqueous dispersion of a thermosetting anionic sulfanilic acid modified melamine-formaldehyde resin, removing the film, incorporating therein a plasticizing agent, drying the film and applying thereto a water-repellent topcoat, wherein said melamine and formaldehyde are present in a mol ratio of about 1:2–1:5, respectively, and the melamine and sulfanilic acid are present in an amount varying between 1:0.05–1:0.08, respectively.

5. A process for treating non-fibrous regenerated cellulosic film comprising the steps of impregnating said film with an aqueous dispersion of a thermosetting anionic sulfanilic acid modified urea-formaldehyde resin, removing the film, incorporating therein a plasticizing agent, drying the film and applying thereto a water-repellent topcoat, wherein the urea-formaldehyde resin contains urea and formaldehyde in a mol ratio varying between 1:1.5–1:3, respectively, and the mol ratio of urea to sulfanilic acid is 1:0.03–1:0.35, respectively.

6. A process for treating non-fibrous regenerated cellulosic film comprising the steps of impregnating said film with an aqueous dispersion of a thermosetting anionic sulfanilic acid modified aminoplast resin containing a plasticizing agent, removing the film from the aqueous resin dispersion, drying the film and applying thereto a water-repellent topcoat, wherein the aminoplast resin is selected from the group consisting of melamine-formaldehyde and urea-formaldehyde.

7. A process for treating non-fibrous regenerated cellulosic film, comprising the steps of impregnating said film with an aqueous dispersion of a thermosetting anionic sulfanilic acid modified melamine-formaldehyde resin containing 0.1–3% by weight of said resin, removing the film from the aqueous dispersion, incorporating therein a plasticizing agent, drying the film and applying thereto a water-repellent topcoat, wherein the mol ratio of melamine to formaldehyde is within the range of 1:2–1:5 and wherein the mol ratio of the melamine to the sulfanilic acid is 1:0.05–1:0.8, respectively.

8. A process for treating non-fibrous regenerated cellulosic film comprising the steps of impregnating said film with an aqueous dispersion of a thermosetting anionic sulfanilic acid modified urea-formaldehyde resin containing 0.1–3% by weight of said resin, removing the film from the aqueous dispersion, incorporating therein a plasticizing agent, drying the film and applying thereto a water-repellent topcoat, wherein the mol ratio of urea to formaldehyde is within the range of 1:1.5–1:3, and wherein the mol ratio of the urea to the sulfanilic acid is within the range of 1:0.03–1:0.35, respectively.

9. A non-fibrous cellulosic film impregnated with a partially polymerized thermosetting anionic sulfanilic acid modified aminoplast resin and coated with a water-repellent topcoat, wherein said aminoplast resin is selected from the group consisting of melamine-formaldehyde and urea-formaldehyde resins.

10. A non-fibrous cellulosic film impregnated with a partially polymerized thermosetting anionic sulfanilic acid modified melamine-formaldehyde resin and coated with a water-repellent topcoat.

11. A non-fibrous cellulosic film impregnated with a partially polymerized thermosetting anionic sulfanilic acid modified urea-formaldehyde resin and coated with a water-repellent topcoat.

12. A process for treating non-fibrous regenerated cellulosic film comprising the steps of impregnating said film with an aqueous dispersion of a thermosetting anionic sulfanilic acid modified aminoplast resin and an aqueous solution of a plasticizing agent, drying the film and applying thereto a water repellent topcoat wherein the aminoplast resin is selected from the group consisting of melamine-formaldehyde and urea-formaldehyde resin.

References Cited in the file of this patent

UNITED STATES PATENTS

| Number | Name | Date |
| --- | --- | --- |
| 2,394,009 | Pollard | Feb. 5, 1946 |
| 2,512,720 | Keim | June 27, 1950 |
| 2,546,575 | Wooding | Mar. 27, 1951 |
| 2,617,744 | Dixon | Nov. 11, 1952 |

FOREIGN PATENTS

| Number | Country | Date |
| --- | --- | --- |
| 112,996 | Australia | Apr. 28, 1941 |
| 590,698 | Great Britain | July 25, 1947 |